United States Patent

Wiggins

[15] 3,707,019
[45] Dec. 26, 1972

[54] APPARATUS FOR REMOVING VISCERA FROM A FISH

[72] Inventor: Gary K. Wiggins, Seattle, Wash.

[73] Assignee: Marine Construction & Design Co., Seattle, Wash.

[22] Filed: Feb. 13, 1970

[21] Appl. No.: 11,092

[52] U.S. Cl. .................................................17/58
[51] Int. Cl. ...........................................A22c 25/14
[58] Field of Search..............................17/58, 59, 60

[56] References Cited

UNITED STATES PATENTS 1,202,627   10/1916   Weber et al. ..............................17/59

FOREIGN PATENTS OR APPLICATIONS 481,139   5/1953   Italy .........................................17/58

143,524   6/1960   U.S.S.R. ...................................17/59

Primary Examiner—Lucie H. Laudenslagen
Attorney—Christensen & Sanborn

[57] ABSTRACT

Apparatus utilizing compressive force externally applied by a roller or other mechanical means advanced headward along a fish extrudes the roe (substantially intact), milt-producing organs and other entrails therefrom while the fish is being conveyed for further processing after beheading in a processing plant. In the disclosed embodiment recirculating presser rollers in turn are brought to bear on individual fish advancing sidewise in succession on a conveyor and while thus bearing on the fish are cam-advanced from an initial location near the tail end of the body cavity toward the head end thereof so as to progressively extrude the viscera out the opened head end.

28 Claims, 9 Drawing Figures

INVENTOR.
GARY K. WIGGINS

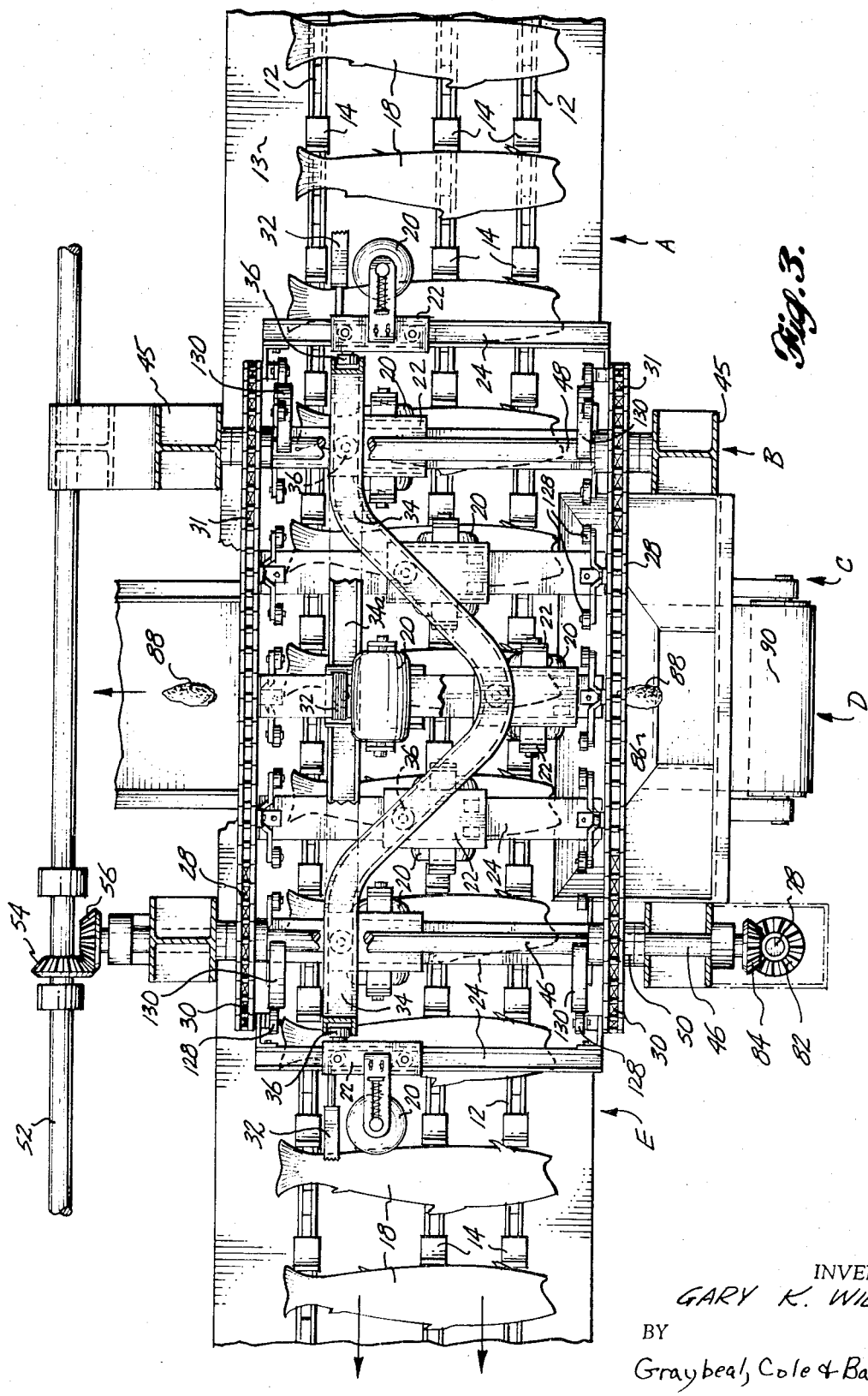

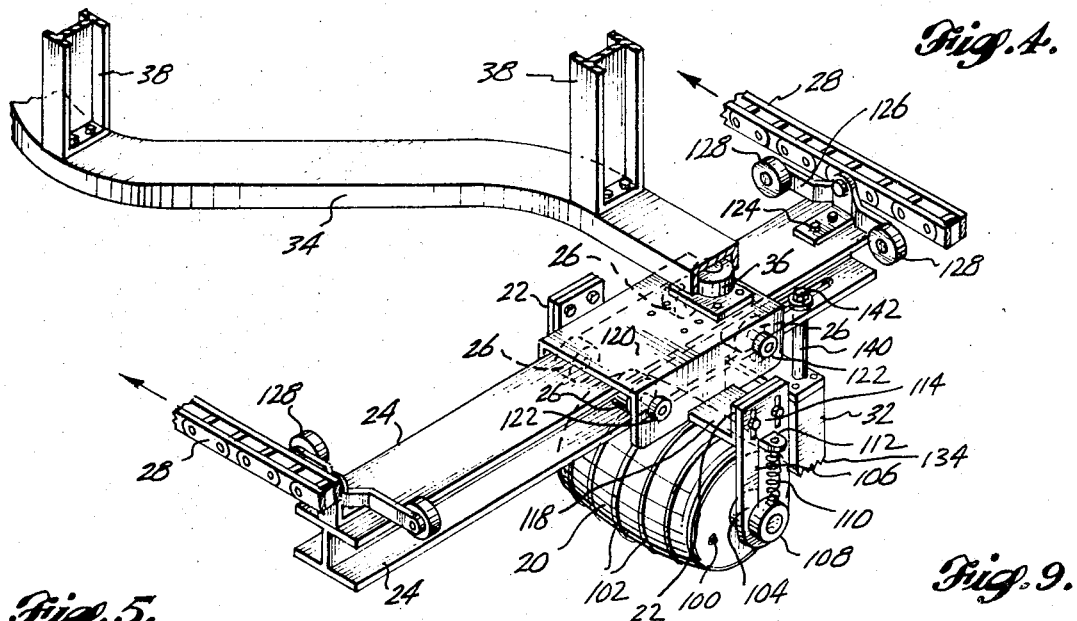

3,707,019

APPARATUS FOR REMOVING VISCERA FROM A FISH

BACKGROUND OF THE INVENTION

1. Field of the Invention

The present invention relates to the fish processing industry, and more particularly to a fish processing method and apparatus for removing the viscera, and in female fish the roe, from fish prior to sliming, i.e., scraping the blood from adjacent the backbone, final cleaning, fin removal and freezing or canning. The method and apparatus are particularly useful in the processing of salmon, but it is to be understood that such have like utility in the processing of other species of fish.

The bulk of a fish canner's line in the instance of salmon canning, is composed of fish varying from 3 to 15 pounds, and it has been found that the size of fish processed at one time is substantially uniform due partly to the fact that fish are generally processed in the same lots in which they were caught, and the majority of fish caught at any given time during the fishing season have grown to a substantially similar size. Some sorting of the fish according to size is also done prior to processing.

In recent years the market for salmon eggs as well as for the male salmon's milt producing organs has increased considerably, but no method or apparatus capable of high speed removal of these items from decapitated salmon without damaging them or the roe is presently available.

Present salmon processing apparatus such as the Model K, manufactured by the Smith-Berger Manufacturing Corporation of Seattle, Washington and known in the trade as the "Iron Chink," is capable of handling fish at rates up to 135 fish per minute, but at present this apparatus must be run at substantially slower speeds to allow time for hand removal of the salmon roe or milt producing organs.

DESCRIPTION OF THE PRIOR ART

Known fish eviscerating machines have employed rotating gripping means to seize a portion of the entrails extending out the cut head end of the fish and pull them out of the body of the fish. These apparatus were not designed to save intact the salmon roe or milt producing organs which were usually destroyed or rendered unusable by the rotating grippers. Danielsson, U.S. Pat. Nos. 2,322,831 and 2,558,608 disclose two fish eviscerators wherein the deheaded fish are held in place while the entrails are pulled therefrom by a pair of meshed rollers. The later Danielsson patent discloses the improvement wherein one portion of the eviscerating rollers includes cavities within the gripping teeth to allow the filled stomach of the fish to expand therein while it is being pulled out of the body cavity so that it will not break within the fish to foul the meat. Christiansen, U.S. Pat. No. 1,539,300 discloses an apparatus wherein a series of stationary rollers ride transversely across the body of the fish to hold it in place while it is deheaded and the entrails are pulled therefrom.

BRIEF SUMMARY OF THE INVENTION

The present invention discloses a unique solution to the problem of removing the roe or male milt producing organs from a fish without damage. A fish conveying means is provided, such as a number of chains mounted in side-by-side relationship in slots on a table and including normally extending lugs spaced thereon to define fish supporting areas. Fish which have been decapitated, in a known manner, preferably in a high speed automatic decapitating device, are placed in the fish supporting areas of the conveyer. At present, these fish move past a plurality of workmen who reach into the opened head end of the body cavity to grasp and remove the roe or male milt producing organs. The fish then are conveyed to a final eviscerating and definning machine and then to a sliming apparatus for final cleaning prior to canning or freezing. The slowness of the present manual egg removal necessitates slowing down both the decapitating machine and the final cleaning apparatus. Even at this reduced speed some of the fish are missed or only part of the roe removed except with experienced workers who are deft and quick. In preferred forms of the the present invention a plurality of rollers are mounted in carriages adjacent the conveyer. The carriages are in turn mounted on tracks which are synchronized to move parallel with the conveyer such that a roller and carriage are associated with each fish supporting area on the conveyer. The rollers may have a width approximately three-fourths the width of the fish supporting area. Also mounted on each track is a clamp which grips the tail of the fish to hold it in place beneath the roller as the fish moved by the conveyer. Each carriage includes a cam follower trained in a generally V-shaped cam track which causes the roller carriage to move transverse the conveyer while at the same time it is moving parallel with it. Thus the roller moves from tail to the cut head end of each fish riding on the conveyer, pressing the body thereof and causing the roe and a substantial portion of the other entrails to be extruded out of the cut head end of the fish. The roe sacs, milt producing organs, and other entrails are fed through a chute onto a second conveyer where the roe sacs and male milt producing organs are separated from the waste entrails. The synchronization of the rollers and the conveyer allows both the deheading machine and the final cleaning machine to be run at top speed, while the gentle pressure on the body of the fish allows the roe sacs and male milt producing organs to be removed without damage thereto. An additional advantage of this invention is that the removal of a substantial portion of the entrails prior to final cleaning allows the final cleaning apparatus to be more easily maintained in a sanitary condition. Other features of the present invention will be apparent from the accompanying drawings and following description.

BRIEF DESCRIPTION OF THE DRAWINGS

FIG. 3 is a plan view partly in section of the apparatus of FIG. 1, including a section of the return portion of the cam track.

FIG. 4 is a partial perspective view of a typical roller and carriage of the present invention, including a cam follower and track.

FIG. 5 is a partial sectional view of a typical roller and carriage moving on its chain mount, and a sectional view of a typical tail clamp mechanism.

FIG. 6 is a partial side elevation view of another typical embodiment of an apparatus made according to the present invention.

FIG. 7 is a partial front elevation view of the apparatus of FIG. 6, including a contoured cam track and followers.

FIG. 8 is a partial front elevation view of another typical embodiment of the roller of the present invention, including a fish restraining disc on one end.

FIG. 9 is a partial front elevation view of still another typical embodiment of the roller of the present invention contoured to conform to the shape of a fish.

DETAILED DESCRIPTION OF THE INVENTION

Figure 1:
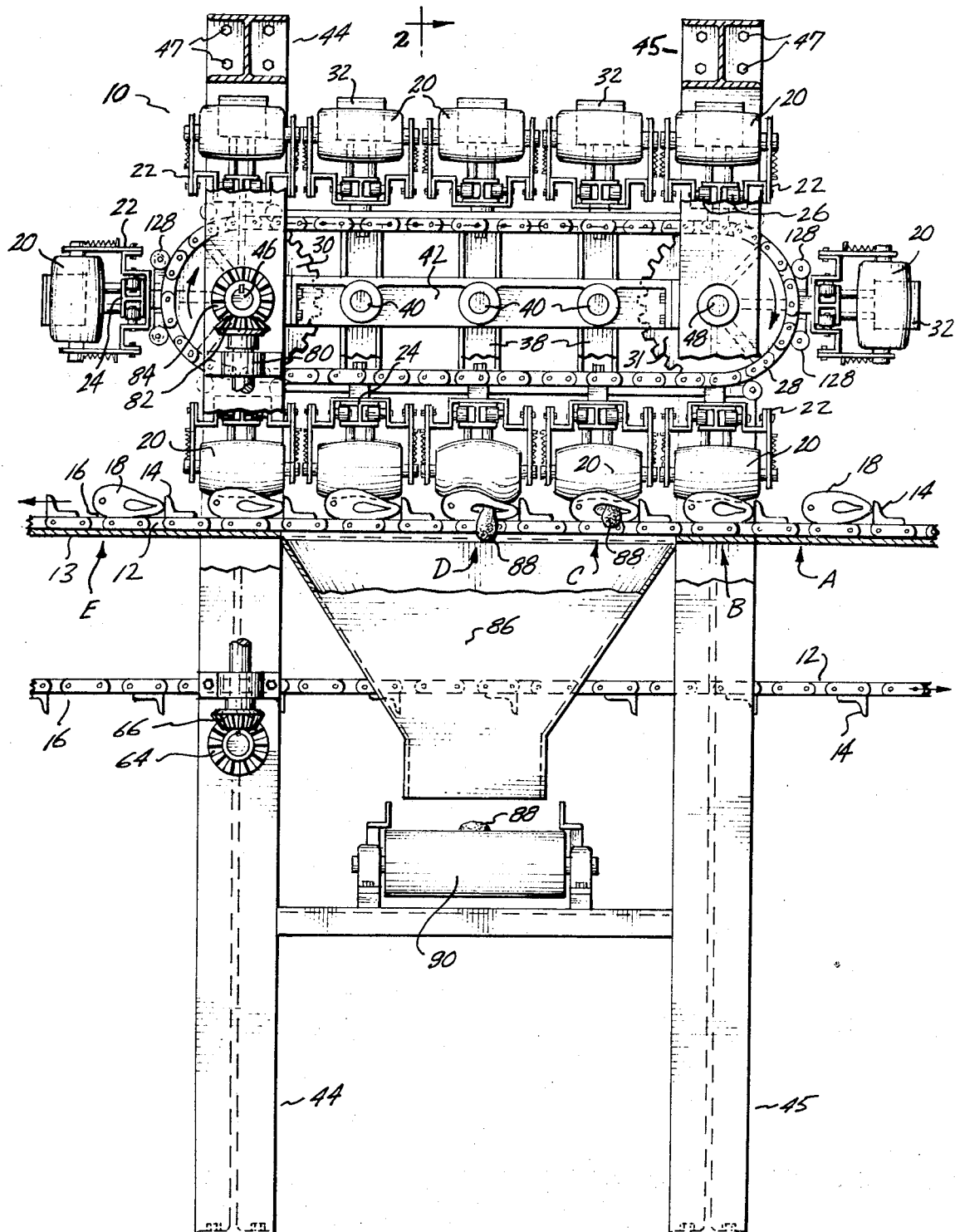
FIG. 1 is a sectional side elevation view of a typical embodiment of the present invention including a plurality of decapitated fish moving on the conveyer.

Referring now to FIG. 1, one embodiment 10 of an apparatus for removing roe and viscera from fish is disclosed. Portions of continuous conveyer chain 12 having normally extending lugs 14 mounted thereon to define fish supporting areas 16 are shown passing through apparatus 10. Decapitated fish 18, such as salmon, are shown resting on the conveyer in each of the fish supporting areas 16. In the usual processing plant situation, conveyer 12 transports the fish from a conventional decapitating machine (not shown), through the apparatus 10, and then to conventional final cleaning, definning and sliming apparatus (not shown).

Figure 2:
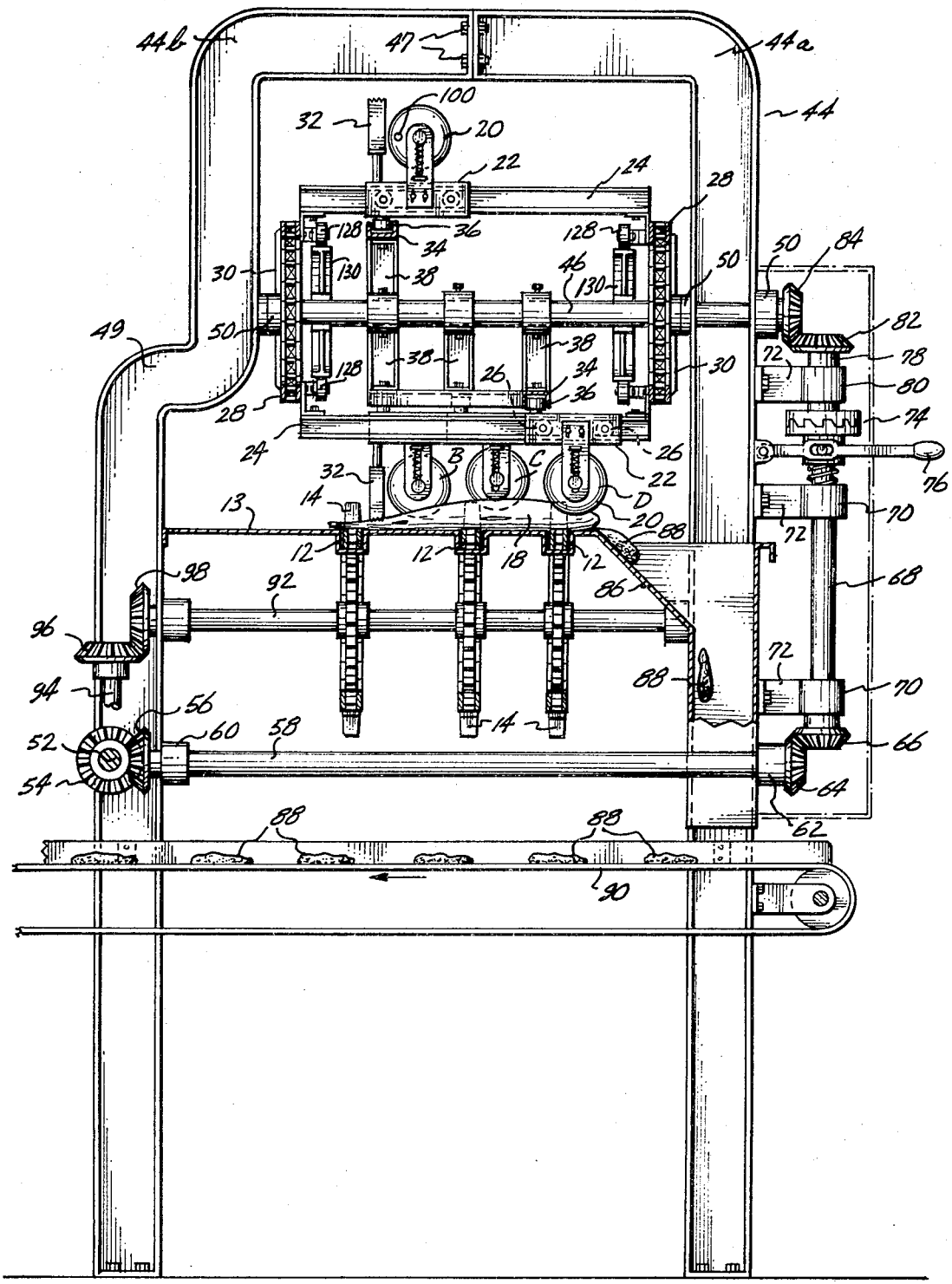
FIG. 2 is a sectional view taken along line 2—2 in FIG. 1.

Low pressure pneumatic rollers 20 (shown in FIG. 1 without peripheral tread ribs) are mounted on carriages 22, as discussed in more detail below with reference to FIG. 4. Referring also to FIG. 2, it is seen that carriages 22 are mounted on tracks 24 and are adapted to ride thereon on rollers 26. Tracks 24 are connected near their ends to continuous chains 28 which ride on longitudinally spaced toothed sprockets 30 and 31. Tail clamps 32 are also fixedly mounted on tracks 24 and are adapted to grip the tail of a fish so that the fish does not move during rolling.

As is best seen in FIG. 3, generally V-shaped cam track 34 is provided to train the roller carriages in their movement transverse to the movement of the fish conveyer. Carriages 22 include roller cam followers 36 which ride in cam track 34. Cam track 34 is connected by means of braces 38 to central transverse support beams 40 which extend between opposed side braces 42. Side braces 42 are in turn connected to major supports 44 and 45 which, as illustrated, are suitably constructed of steel I-beams. As is best seen in FIG. 2 the major support beams are suitably constructed of two substantially L-shaped beams 44a and 44b, joined by conventional fasteners such as nuts and bolts 47 or welds. Beam 44b additionally includes a laterally outward bend 49 which provides additional transverse area adjacent the fish conveying chain.

Sprockets 30 and 31 are mounted on the opposite ends of axles 46 and 48 which are rotatably mounted in bearings 50 on the opposed legs of main braces 44 and 45.

Apparatus 10 is driven through a system of bevel gears and axles from jackshaft 52 (FIGS. 2 and 3), which in a conventional processing plant would interconnect and supply power to both the decapitating apparatus and the final cleaning apparatus. Bevel gear 54 is mounted on shaft 52 and is adapted to mate with gear 56 on shaft 58. Shaft 58 is rotatably mounted in bearings 60 and 62 and further includes bevel gear 64 mounted opposite gear 56. Gear 64 in turn mates with gear 66 to translate rotary motion to axle 68 mounted in bearings 70 which are connected to major support beam 44 by laterally extending brackets 72. A control mechanism comprising a positive engaging toothed clutch 74 having an operating lever 76 is provided on axle 68 to allow the power chain from the jackshaft to apparatus 10 to be broken. Axle 78 which is rotatably mounted in bearing 80 transmits power from clutch 74 through bevel gear 82 to bevel gear 84 and finally to shaft 46 which drives toothed sprockets 30 and consequently chains 28 which run around drive sprockets 30 and follower sprockets 31. It is also contemplated that other electrical, hydraulic or mechanical drive arrangements might also be used to power apparatus 10.

Slide 86 is provided adjacent conveyer 12 to catch the roe and other entrails 88 extruded from the salmon and guide them onto conveyer 90 where the roe and male milt producing organs are separated from the other entrails.

Referring now to FIG. 3, it will be seen that roller cam followers 36 are continually disposed in cam track 34, and that cam track 34 has a straight return portion 34a.

Referring again to FIGS. 1–3, in operation a decapitated fish 18 mounted on table 13 is moved thereon by lugs 14 on coneyer chains 12 towards the continually rotating roe removing apparatus 10. At station A, tail clamp 32 and roller 20 rotate around sprocket 31 to make contact with fish 18. At station B, tail clamp 32 firmly holds the fish against table 13 while roller 20 is centered on the fish just forward of the tail clamp. At station C roller cam follower 36 has entered the V-shaped portion of cam 34, and thus carriage 22 and roller 20 are moving towards the cut head end of the fish pressing the body of the fish and compressing the soft abdominal cavity causing the roe and other entrails 88 to begin to be extruded out the cut head end. At station D, the roller and carriage has reached the full forward position and the roe and entrails are extruded out of the body cavity onto slide 86 where they are funneled onto conveyer 90. The continued driving of chains 28 by sprockets 30 causes carriage 22 to follow cam track 34 back across the length of the fish until finally, at station E, the tail of the fish is released as clamp 32 and roller 20 rotate upwardly around sprockets 30 and start the return trip to station A in the straight upper portion 34a of the cam track.

The synchronization of the tail clamps and rollers with the fish holding areas 16 is a result of, as seen in FIG. 2, conveyers 12 being mounted on axle 92 which is also driven off of jackshaft 52 through vertical drive shaft 94 and mating bevel gears 96 and 98.

Referring now to FIG. 4, it will be seen that low pressure pneumatic roller 20 includes an air valve 100 which allows pressure within the roller to be maintained at approximately 2 pounds per square inch for normal operation. The pressure in the roller may be increased or decreased for use with exceptionally large or small fish. Treads 102 are also provided running circumferentially around roller 20 to hold the decapitated fish under the roller while it moves from its tail to cut head end. These treads overcome the tendency of the fish to slide out from under the roller when pressure is exerted on it. Rollers 20 are mounted on axles 104 which are held in slots 106 by lug nuts 108. Compression springs 110 extend between the lug nuts and outwardly extending flange 112 to bias the axle and roller towards the bottom of the slot. Springs 110 are relatively strong and thus roller 20 is able to compress the soft lower abdomen portion of the fish while not crushing the backbone and rib cage structure.

Referring also to FIG. 5, carriage 22 includes a pair of roller supporting arms 114 connected by conventional means such as nuts and bolts 116 to flanges 118 extending outwardly and upwardly from the carriage body 120. As disclosed, the carriage body includes rollers 26 mounted inwardly of the sides of the carriage body in bearings 122. While four rollers mounted near the corners of the carriage body are shown in the particular disclosed embodiment, it is understood that obvious variations in number and configuration of the rollers are contemplated. Carriage support track 24 is of I-beam construction, and rollers 26 are adapted to run in the side channels of the track. FIG. 4 further discloses the roller cam follower 36 disposed in cam track 34.

Brackets 124 are conventionally mounted near the ends of track 24 and include outwardly extending arms 126 having stabilizer guide rolls 128 rotatably mounted near their ends. Referring now to FIG. 5, arcuate stabilizer track 130 is shown mounted adjacent axle 48 at the point where continuous chain 28 bends around sprocket 31. It is understood that a similar track is provided adjacent sprocket 30. As a roller and carriage is carried around sprocket 31 stabilizer rolls 128 contact stabilizer track 130 and ride thereon to maintain the carriage at an angle normal to chain 28 and to counteract the force of gravity tending to accelerate the movement of the carriage around the sprocket. It is readily understood that when the carriage and roller move around sprocket 30 after having completed the rolling operation, the stabilizer rollers and track again act to maintain the carriage at an angle normal to chain 28 and to prevent the carriage from falling back towards fish conveyer 12.

FIG. 5 further discloses one embodiment of a tail clamp comprising a body portion 132 having a roughened bottom portion 134 to improve the grip of the clamp of the fish. Channels 136 including springs 138 are provided in the body of the clamp to receive legs 140. Legs 140 are connected at one end by bolts 142 or other conventional means to the bottom flanges of carriage support track 24, while at their other end, foot 144 is supported by spring 138. Springs 138 are relatively stiff and consequently clamp 132 is biased downwardly with sufficient force to hold a fish firmly in place beneath the roller as the fish is moved along by the conveyer, but not with such force as to cause inordinate bruising of the meat or crushing of the bone structure of the fish.

Referring now to FIGS. 6 and 7 an alternate form of apparatus for removing the roe or male milt producing organs form a fish is disclosed comprising a low pressure air bag 146 having a support backing 148 which is pivotal about pin 150 which extends between arms 152.

The pivoting of the air bag and support frame is actuated by the movement of cam roller 154 as it moves on arcuate cam track 156. Cam roller 154 is connected to air bag support 148 by pin 156 which runs through bushing 158 in track 24. Spring 160 is provided to bias the cam roller upwardly.

In operation, low pressure air bags are associated with each decapitated fish 18 being carried by fish conveyer 12. Cam track 156 is curved downwardly in its central portion, and thus as cam rollers 156 move therealong pin 156 moves downwardly to cause the air bag 146 to be pressed against the body of the fish from the tail forward to the cut head end. This pressue causes the roe and other viscera within the opened body cavity of the fish to be extruded outwardly onto slide 86 in the same manner as discussed above with regard to the roller embodiment.

FIGS. 8 and 9 disclose two additional embodiments of non-pressurized resilient rollers. The roller of FIG. 8 is conically shaped and thus applies more pressure to the abdomen portion of the fish than to the backbone area. A fish restraining disc 162, of metal or other suitable material, is provided to keep the fish from sliding laterally during rolling. The roller of FIG. 9 is contoured to conform substantially to the shape of the side of a fish to allow the abdomen portion of the fish to be compressed without crushing the backbone and rib cage portion.

From all of the above it will be seen that a method, as well as apparatus for performing the method, of removing the roe or male milt producing organs and other entrails of decapitated fish is disclosed comprising the steps of placing the decapitated fish in side by side relationship on a continuously moving conveyer, holding the fish near their tail portions to prevent sliding, of the fish out from under the roller or other squeezing apparatus, and applying squeezing pressure to the fish from its tail forward to its cut head end to extrude the roe or milt producing organs and other viscera out the opened body cavity.

The invention may be embodied in other specific forms without departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. Apparatus for eviscerating decapitated fish comprising fish conveyor means, pressure roller means disposed adjacent said conveyor means and movable both parallel and transverse to said conveyor, clamp means to hold said decapitated fish beneath said roller means, said roller means and said conveyor means being synchronized such that said roller means runs under applied pressure on and along said decapitated fish in the direction from tail to cut head end.

2. The apparatus of claim 1 wherein said fish conveyor means comprises a table having a longitudinal slot therein, a movable chain in said slot, said chain having spaced lugs disposed thereon and extending upwardly from said table.

3. The apparatus of claim 1 wherein said roller means comprises a movable carriage and a fluid filled flexibly elastic bag rotatably disposed on said movable carriage.

4. The apparatus of claim 1 wherein said roller means includes a low pressure pneumatic roller.

5. The apparatus of claim 1 wherein said roller means includes a flexible roller of varying radius which substantially conforms to the shape of a fish.

6. The apparatus of claim 3 further including a track and wherein said carriage is mounted for movement transverse to said conveyor means on said track, said track being mounted on continuous chain means for movement parallel to said conveyor means.

7. Apparatus for removing the roe from a decapitated fish comprising fish conveying means moving in a first direction having a plurality of fish supporting lugs disposed thereon, a plurality of roller means disposed adjacent said fish conveying means and moving in said first direction, said roller means synchronized with said fish conveying means such that each of said fish supporting lugs has a roller means associated therewith, cam means training said roller means such that said roller means moves in a second direction transverse to said first direction to squeeze a decapitated fish progressively in the direction from tail to cut head end, and fish holding means associated with each of said roller means to hold said decapitated fish beneath said roller means during squeezing.

8. The apparatus of claim 7 wherein said roller means includes a low pressure fluid filled bag.

9. The apparatus of claim 7 wherein said roller means includes a roller of substantially conical shape.

10. Apparatus for extracting roe from a decapitated fish comprising a first moving chain having a plurality of lugs mounted thereon for conveying fish and a second moving chain adjacent said first chain having carriage support means disposed thereon, carriage means disposed on said carriage support means and movable thereon transverse the movement of said chains, roller means connected to said carriage means whereby fish carried by said lugs are rolled under pressure in the direction from their tails to their cut head ends, and clamp means on said carriage support means for holding said fish stationary with respect to said rollers during rolling.

11. The apparatus of claim 10 wherein said roller means includes a spring mounted pneumatically inflated flexible roller.

12. The apparatus of claim 10 wherein said roller means includes a spring mounted relatively rigid roller of varying cross section whereby a greater pressure is applied to the belly portion of said fish than to the back portion.

13. The apparatus of claim 10 wherein said carriage means includes a cam follower associated with a cam track such that the movement of said carriage means on said roller support means is governed by the shape of said cam track.

14. Apparatus for extracting fish roe from a decapitated fish comprising a moving chain having a plurality of spaced lugs disposed thereon to form fish supporting areas, each of said areas adapted to support one fish, support frames straddling said chain, longitudinal beams connecting said support frames, sprocket means mounted opposite each other on said support frames, a driving axle connecting two opposed sprockets, continuous chains mounted on said sprockets, carriage support bars connected transversely between said chains and spaced to correspond to said fish support areas, clamp means disposed on said carriage support bars, carriages disposed on said carriage support bars, a cam track adjacent said chains, cam follower means disposed on said carriages, said cam follower adapted to follow said cam track, roller means mounted on said carriages, said lug bearing chain and said carriage support bar carrying chains adapted to move at the same speed such that a roller on a carriage following the cam track presses a decapitated fish held by said clamp means progressively in the direction from tail to cut head end.

15. Apparatus for eviscerating and extracting roe or milt-producing organs from decapitated fish comprising fish conveying means, fish holder means spacedly mounted on said conveying means in successive positions therealong so as to hold the fish for conveyance along a defined path, fish squeezing means operated and synchronized to move with said fish holder means and formed and arranged to apply pressure to the fish in successive regions thereon progressing from the tail thereof to the head end thereof, said squeezing means being operated to shift the region of applied pressure on each fish as a function of conveyance movement of the fish along said path, and fish-engaging means operable to prevent said fish from sliding lengthwise in said fish holding means during squeezing.

16. The apparatus of claim 15 wherein said fish squeezing means includes a fluid-filled bag disposed on a frame, said frame adapted to pivot, and pivot actuation means connected to said frame.

17. The apparatus of claim 16 wherein said pivot actuation means includes a pin member having a cam follower connected thereto, said cam follower trained by a cam track such that movement of the follower on the track causes said frame to pivot.

18. Apparatus for eviscerating decapitated fish comprising means including a support for holding a beheaded fish with a side thereof disposed against the support, presser means having fish engaging portions arranged thereon in successively adjacent relationship, said presser means portions being guided for movement into non-sliding pressing contact respectively against successively adjacent areas on the fish extending lengthwise thereof, commencing near the tail end of the body cavity and progressing therealong toward the beheaded end of the fish, and means so to operate said presser means whereby the viscera is extruded progressively out of the open head end of the body cavity.

19. The apparatus defined in claim 18, wherein the presser means comprises a roller having a curved peripherally extending surface, successively adjacent sectoral portions of which comprise said fish-engaging portions.

20. The apparatus defined in claim 19, wherein such roller is elastically flexible thereby adapting it when under pressure to conform to the compressed cross-sectional configuration of the fish during contact therewith.

21. The apparatus defined in claim 20, wherein the roller comprises a fluid-filled bag and wherein the means for squeezing the fish includes yieldable pressure-applying means for pressing the bag against the fish.

22. The apparatus defined in claim 19, wherein the means for squeezing the fish further includes a substantially flat supporting surface adapted to support the fish while under pressure from the roller.

23. The apparatus defined in claim 19, wherein the roller is of annular from and mounted to turn freely by contacting the fish on an axis oriented transversely to the fish.

24. The apparatus defined in claim 23, wherein the roller is of generally cylindrical form and peripherally ribbed at intervals along its length.

25. The apparatus defined in claim 23, wherein the roller is preformed with a diameter that increases lengthwise thereof over a portion of its length.

26. The apparatus defined in claim 19, further including a fish conveyor having a succession of similar fish holding means operable to receive and hold individual fish in positions successively spaced lengthwise of the path of conveyor movement, and a succession of similar presser means positionally and operatively related to the respective fish holding means, means to move the respective presser means synchronously with the fish conveyor so as to maintain such presser means in respective operative positional relationship for engaging fish held by said holding means during conveyance of the fish, and the means to operate the presser means includes actuator means therefor operable as a function of conveyor movement of the fish holding means along the path of conveyance.

27. The apparatus defined in claim 18, further including a fish conveyor having a succession of similar fish holding means operable to receive and hold individual fish in positions successively spaced lengthwise of the path of conveyor movement, and a succession of similar presser means positionally and operatively related to the respective fish holding means, means to move the respective presser means synchronously with the fish conveyor so as to maintain such presser means in respective operative positional relationship for engaging fish held by said holding means during conveyance of the fish, and means to operate the presser means includes actuator means therefor operable as a function of conveyor movement of the fish holding means along the path of conveyance.

28. The apparatus defined in claim 18, and further including means to move the support with the fish held thereon.

* * * * *